(12) United States Patent
Choi et al.

(10) Patent No.: US 8,874,107 B2
(45) Date of Patent: Oct. 28, 2014

(54) METHOD FOR CONTROLLING MOBILE STATION'S SCANNING OPERATION AND BASE STATION PERFORMING THE SAME

(75) Inventors: Young Kyu Choi, Incheon (KR); Ki Back Kim, Seoul (KR); Han Seok Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/204,015

(22) Filed: Aug. 5, 2011

(65) Prior Publication Data
US 2012/0094662 A1 Apr. 19, 2012

(30) Foreign Application Priority Data
Oct. 14, 2010 (KR) .................. 10-2010-0100293

(51) Int. Cl.
*H04W 4/00* (2009.01)
*H04W 24/10* (2009.01)
*H04W 36/00* (2009.01)
*H04W 48/16* (2009.01)

(52) U.S. Cl.
CPC .............. *H04W 24/10* (2013.01); *H04W 48/16* (2013.01); *H04W 36/0088* (2013.01)
USPC ............ 455/434; 455/436; 370/331; 370/338

(58) Field of Classification Search
USPC ......................................................... 455/434
See application file for complete search history.

(56) References Cited

U.S. PATENT DOCUMENTS

| 2008/0056195 | A1* | 3/2008 | Lee et al. ........................ 370/331 |
| 2008/0081618 | A1* | 4/2008 | Krantz et al. .................. 455/434 |
| 2009/0143067 | A1* | 6/2009 | Kim et al. ...................... 455/434 |
| 2009/0163206 | A1* | 6/2009 | Adatrao et al. ................ 455/436 |
| 2009/0190555 | A1* | 7/2009 | Oguchi .......................... 370/331 |
| 2009/0274134 | A1* | 11/2009 | Wang et al. .................... 370/338 |
| 2011/0302650 | A1* | 12/2011 | Brown ............................. 726/21 |

\* cited by examiner

*Primary Examiner* — Timothy Pham
(74) *Attorney, Agent, or Firm* — Jefferson IP Law, LLP (57) ABSTRACT

A Base Station (BS) and method of the BS for controlling a scanning process of a mobile station are provided The method of the base station for controlling a scanning process of a mobile station includes receiving, at the base station, a scan request issued in association with the mobile station, determining whether the mobile station has a scan in progress by referencing a scan record table, transmitting a scan response to the mobile station, and recording a scanning status of the mobile station in the scan record table. The method and base station for controlling the scanning process of a mobile station is advantageous to avoid the collision of scanning processes.

20 Claims, 3 Drawing Sheets

METHOD FOR CONTROLLING MOBILE STATION'S SCANNING OPERATION AND BASE STATION PERFORMING THE SAME

PRIORITY

This application claims the benefit under 35 U.S.C. §119 (a) of a Korean patent application filed on Oct. 14, 2010 in the Korean Intellectual Property Office and assigned Serial No. 10-2010-0100293, the entire disclosure of which is hereby incorporated by reference.

BACKGROUND OF THE INVENTION

1. Field of the Invention

The present invention relates to a Base Station (BS) and method of the BS for controlling a Mobile Station (MS). More particularly, the present invention relates to a BS and a method of the BS for controlling the scanning operation of an MS for avoiding problems caused by coexistence of MS-initiated and BS-initiated scanning attempts.

2. Description of the Related Art

In the Mo-Worldwide Interoperability for Microwave Access (M-WiMAX) of the related art, frequency scanning of an MS is performed to discover at least one target handover cell among neighbor cells using frequencies different from that of the serving cell. That is, once scan trigger conditions are informed by a Type, Length, Value (TLV) field in a Downlink Channel Descriptor (DCD) message broadcast by a BS, the MS transmits a mobile scan request (MOB_SCN-REQ) message when the scan trigger conditions are fulfilled. Afterward, the MS is assigned a scan duration by means of a mobile scan response (MOB_SCN_RSP) message and collects information about neighbor cells via a scanning process. The scan trigger conditions include Received Signal Strength Indication (RSSI) and Carrier to Interference plus Noise Ratio (CINR). The frequency scan triggered by the request from the MS is referred to as an MS-initiated scan.

As the need for improvement of a WiMAX network has increased gradually, enhanced technologies such as Load Balancing (LB), Inter-Cell Interference Coordination (ICIC), Location-Based Service (LBS), and Self-Organizing Network (SON) have been adopted. Most of these technologies can be executed with the exchange of information such as RSSI, CINR, and Relative Delay between a serving BS and neighboring BSs. The serving BS transmits the MOB_SCN_RSP message, without request from the MS, to trigger the MS to carry out scanning and acquires the information necessary from a mobile scan report (MOB_SCN_REP) message transmitted by the MS after a predetermined time. This is referred to as a BS-initiated scan or an unsolicited scan.

While the MS-initiated scan is in progress, the MOB_SCN_RSP message for triggering the BS-initiated scan may be received during the interleaving interval. In this case, the MS starts the BS-initiated scan based on the scan parameters received without completion of the MS-initiated scan. This problem also can occur when the scan trigger conditions indicated by TLV of the DCD message are fulfilled during the interleaving interval in the progress of BS-initiated scan. In this case, the MS transmits the MOB_SCN-REQ message to the BS and the BS replies by transmitting the MOB_SCN_RSP message to the MS such that the MS starts the MS-initiated scan based on the scan parameter received newly in the state before the completion of the previous BS-initiated scan. Such a scan timing conflict causes scanning errors, resulting in performance degradation.

SUMMARY OF THE INVENTION

Aspects of the present invention are to address at least the above-mentioned problems and/or disadvantages and to provide at least the advantages described below. Accordingly, an aspect of the present invention is to provide a method for controlling a mobile station's scanning operation and a base station therefor.

In accordance with an aspect of the present invention, a method for a base station to control a scanning process of a mobile station is provided. The method includes receiving, at the base station, a scan request issued in association with the mobile station, determining whether the mobile station has a scan in progress by referencing a scan record table, transmitting a scan response to the mobile station, and recording a scanning status of the mobile station in the scan record table.

In accordance with another aspect of the present invention, a base station for controlling a mobile station to scan base stations is provided. The base station includes a scan control unit for receiving, at the base station, a scan request issued in association with the mobile station, for determining whether the mobile station has a scan in progress by referencing a scan record table, for transmitting a scan response to the mobile station, and for recording a scanning status of the mobile station in the scan record table, a scan request component for generating a scan request to the scan control unit, and a communication unit for delivering the scan request received from the mobile station to the scan control unit and for transmitting the scan response received from the scan control unit to the mobile station.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A description is made of a method and a Base Station (BS) for controlling a scanning operation of a Mobile Station (MS) according to exemplary embodiments of the present invention with reference to accompanying drawings.

First of all, a typical scanning process is described hereinbelow.

Regardless of which of the MS and BS has triggered the scan, it is carried out in the same manner. That is, whether the MS is to perform a scanning operation is determined using the scan parameters carried in the mobile scan response (MOB_SCN_RSP) message as shown in Table 1.

TABLE 1

| Parameter | Description |
| --- | --- |
| Scan duration | Duration for which the MS performs scanning (unit: frame). Also, referred to as scan duration interval or scan interval. |
| Start frame | Index of frame in which first scan interval start. |
| Interleaving interval | Interval between two scan intervals for which MS can communicate with serving BS. |
| Scan iteration | Number of iterations of scan interval. |

In case of an MS-initiated scan, no scan result is reported to the serving BS in general. The scan result is just used by the MS to determine a BS to which handover is made among the neighbor BSs. In case of the BS-initiated scan, the BS has to receive a mobile scan report (MOB_SCN_REP) message from the MS to acquire the scan result. The related parameters are transmitted in the MOB_SCN_RSP message.

TABLE 2

| Parameter | Description |
| --- | --- |
| Report mode | 0b00: No report |
| | 0b01: Periodic report |
| | 0b10: Event-triggered report |
| | 0b11: One-time scan report |
| Report period | Time for MS to report scan result (once or periodic) |
| Report metric | Metric for BS to request MS to report Mean CINR, mean RSSI, relative delay, etc. |

In case of the MS-initiated scan, if the scan is performed a predetermined number of times, it is regarded that the scan is completed successfully. In case of a BS-initiated scan, if the MOB_SCN_REP message is received by the serving BS, it is regarded that the scan is completed successfully.

The current Institute of Electrical and Electronics Engineers (IEEE) 802.16 standard specifies the operations of the MS-initiated scan and BS-initiated scan individually. However, the IEEE 802.16 standard has no agreed way to deal with cases in which the MS-initiated and BS-initiated scans or multiple BS-initiated scans are triggered in series without completion of prior scans. It is possible to analogize that the MS performs scanning based on the scan parameters carried by the most recently received MOB_SCN_RSP message.

Accordingly, there exists the possibility of a scan collision problem in the current IEEE 802.16 standard. That is, the MOB_SCN_RSP message triggering a BS-initiated scan can be received while the MS-initiated scan is in progress. In this case, the MS starts the BS-initiated scan based on the scan parameters received before the MS-initiated scan is completed. This is because the MS can communicate with the serving BS in normal communication mode, i.e. regardless of the scanning process, during the interleaving interval.

Similarly, there can be a case where the scan trigger conditions indicated by a Type, Length, Value (TLV) field of the Downlink Channel Descriptor (DCD) message are fulfilled in the progress of the BS-initiated scan. In this case, the MS transmits the mobile scan request (MOB_SCN_REQ) message to the BS, and the BS replies by transmitting the MOB_SCN_RSP message. Accordingly, the MS-initiated scan is started based on the scan parameters newly received before the completion of the BS-initiated scan. In the worst case, the MS-initiated scan and the BS-initiated scan may cause an infinite loop of scanning by overwriting with each other.

Also, there can be a case where multiple BS-initiated scans collide with each other. For example, an entity responsible for Load Balancing (LB) and another entity responsible for Inter-Cell Interference Coordination (ICIC) can request the same MS for a BS-initiated scan. If the two entities issue the scan requests independently without cooperation with each other, the BS-initiated scans are overwritten by each other. Taking into consideration the tendency in which newly introduced functions are operating with the BS-initiated scan, it is difficult to ignore the probability of the scanning process collision.

The scanning failure caused by a scanning collision is likely to degrade the performance of the algorithm of the function operating based on the information acquired as a result of the BS-initiated scan. In case of an MS-initiated scan, the scanning collision causes failure of target handover BS discovery, resulting in mobility problems.

The scanning collision scenarios can be summarized as shown in Table 3.

TABLE 3

| | scan in progress | |
| --- | --- | --- |
| scan triggered later | MS-initiated scan | BS-initiated scan |
| MS-initiated scan | | Case 1a |
| BS-initiated scan | Case 1b | Case 2 |

A situation in which an MS-initiated scan is overwritten by the scan triggered by the same MS cannot occur in the normally configured MS so as to be omitted in Table 3. Cases 1a and 1b are the collisions between an MS-initiated scan and a BS-initiated scan, and case 2 is the collision between two scans initiated by two BSs.

Figure 1:
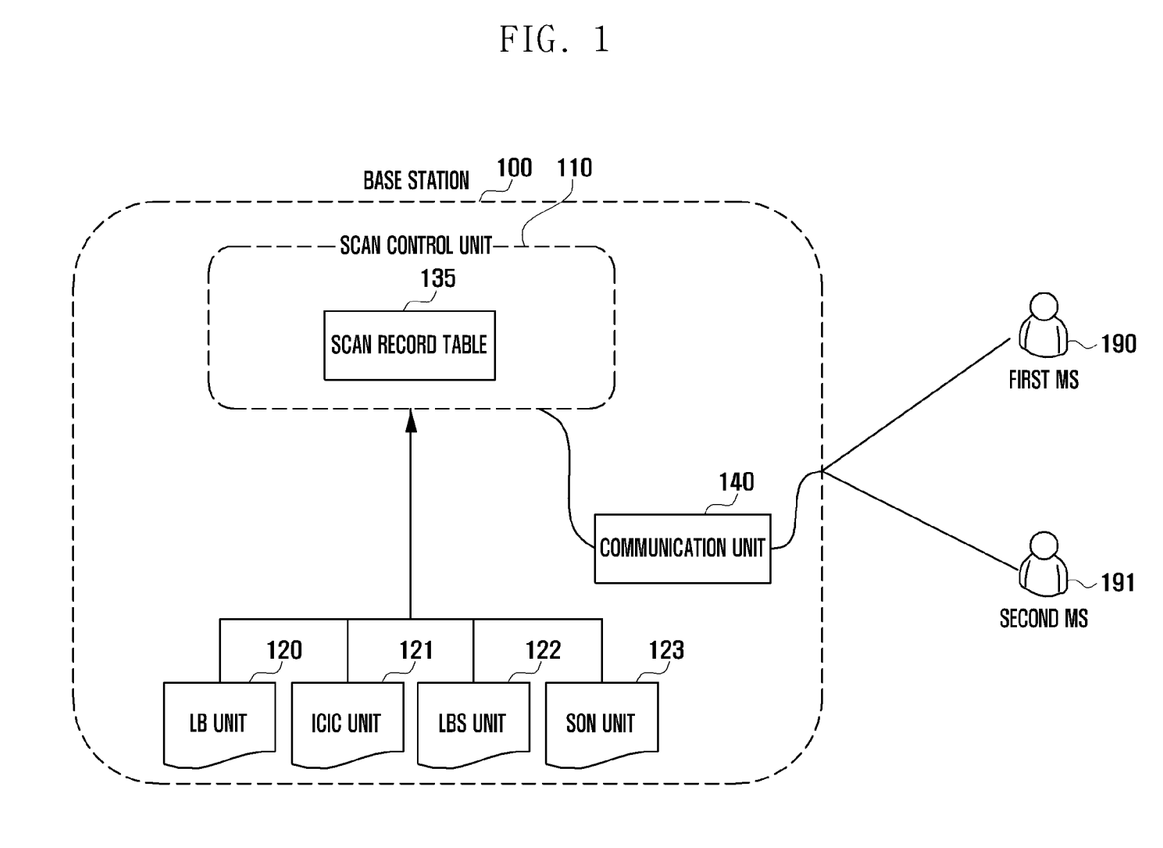
FIG. 1 is a block diagram illustrating a configuration of a Base Station (BS) according to an exemplary embodiment of the present invention.

FIG. 1 is a block diagram illustrating a configuration of a BS according to an exemplary embodiment of the present invention.

Figure 2:
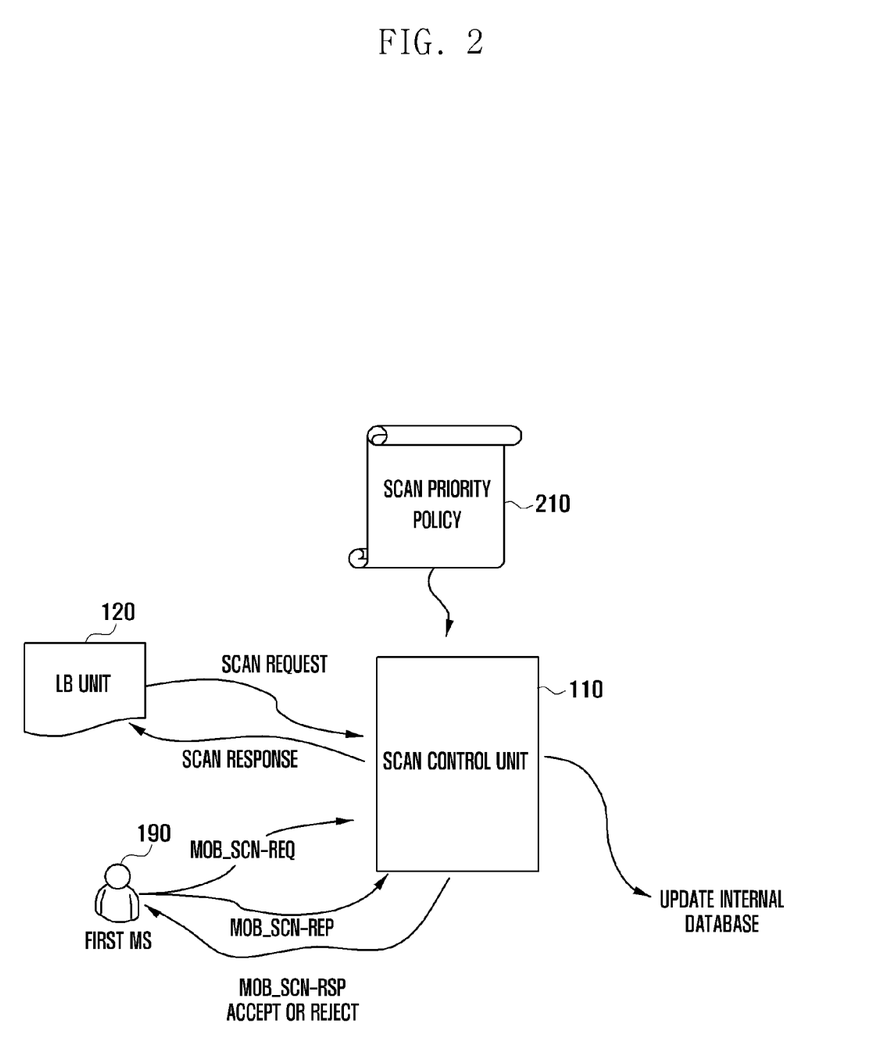
FIG. 2 is a diagram illustrating message flows among components of a BS and a Mobile Station (MS) for a scan control method according to an exemplary embodiment of the present invention.

FIG. 2 is a diagram illustrating message flows among components of a BS and an MS for a scan control method according to an exemplary embodiment of the present invention.

Referring to FIG. 1, the BS 100 includes a scan control unit 110, a Load Balancing (LB) unit 120, an ICIC unit 121, a Location Based Service (LBS) unit 122, and a Self-Organizing Network (SON) unit 123. Here, the LB unit 120, the ICIC unit 121, the LBS unit 122, and the SON unit 123 are depicted as BS components capable of requesting the scan control unit 110 for a scan (scan request components). However, the BS can include some or all of the components. Although not enumerated herein, the BS 100 can further include other BS components capable of requesting the scan control unit 110 for scanning. For convenience, the description is made under the assumption that the BS 100 includes the LB unit 120, ICIC unit 121, LBS unit 122, and SON unit 123.

In FIG. 1, the BS 100 operates as the serving BS of the MSs 190 and 191.

The scan control unit 110 receives a scan request from one of the BS components 120, 121, 122, and 123, the first MS 190, and the second MS 191. Here, the scan request transmitted by one of the BS components 120, 121, 122, and 123 is referred to as a BS-initiated scan request, and the scan request transmitted by one of the MSs 190 and 191 is referred to as an MS-initiated scan request. In compliance with the IEEE 802.16 standard, the scan request transmitted by one of the MSs 190 and 191 can be also referred to as MOB_SCN_REQ message.

Referring to FIG. 2, the scan control unit 110 can accept or reject the scan request received from at least one of the MSs 190 and 191 by referencing the scan condition and scan priority policy 210. If it is determined to accept the scan request, the scan control unit 110 updates an internal database storing the scanning status which is used for determining whether to accept a scan request afterward. It is determined to accept the scan request, the scan control unit 110 sends the first MS 190 a scan response message. More particularly, the scan control unit 110 sends the first MS 190 the MOB_SCN_RSP message in compliance with the IEEE 802.16 standard. Upon receipt of the scan response message, the first MS 190 performs scanning and sends the BS 100 a scan report message. The scan report message can be the MOB_SCN_REP message in compliance with the IEEE 802.16 standard.

A communication unit 140 transfers the scan request and scan report messages received from the MSs 190 and 191 to the scan control unit 110 and transmits the scan response message generated by the scan control unit 110 to the MSs 190 and 191. Unless otherwise noted, if it is expressed that the scan control unit 110 and the MSs 190 and 191 exchange signals or messages, this means that the signals or messages are transmitted and/or received by means of the communication unit 140.

Figure 3:
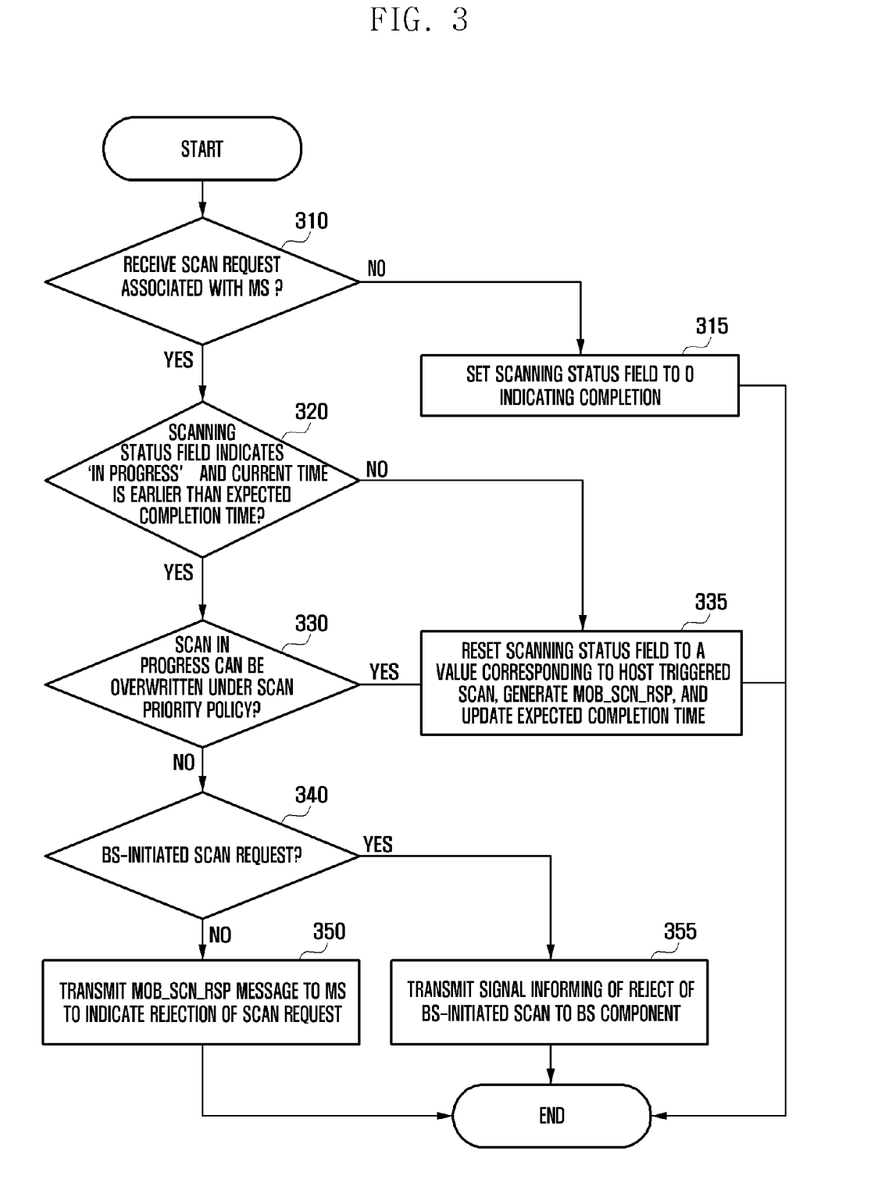
FIG. 3 is a flowchart illustrating a scan control procedure of a BS according to an exemplary embodiment of the present invention.

More detailed descriptions are made of the operations of the individual components of FIGS. 1 and 2 with reference to FIG. 3.

FIG. 3 is a flowchart illustrating a scan control procedure of a base station according to an exemplary embodiment of the present invention. Although the description is made of FIG. 3 with the terms in compliance with the IEEE 802.16 standard, the present invention is not limited thereto but can be applied to any communication system in which an MS scans to discover a BS.

A description is made of a scan control on the first MS 190 in the exemplary embodiment of FIG. 3.

Referring to FIG. 3, the scan control unit 110 monitors to detect a receipt of a message and, if a message is received, determine whether the message is a scan trigger, i.e., a scan request message in step 310. The scan control unit 110 can perform the scan control of multiple MSs 190 and 191 within the coverage of the BS 100.

The scan control unit 110 also can receive the scan request message that one of the MSs 190 and 191 and BS components 120, 121, 122, and 123 has issued to request for the scan control of a specific MS.

The scan request message can be handled or treated in different manners according to which of the MSs 190 and 191 and BS components 120, 121, 122, and 123 has transmitted it.

In case of the MS-initiated scan, one of the MSs 190 and 191 transmits the scan request message to the BS 100. The scan message transmitted by one of the MSs 190 and 191 can be a MOB_SCN_REQ message. The scan message transmitted by one of the MSs 190 and 191 can include an identifier of the MS requesting the scan and an identifier for identifying the MOB_SCN_REQ message. For example, the first MS 190 transmits the scan request message including the identifier of the first MS 190 and identifier of the scan request message to the BS 100.

In case of a BS-initiated scan, one of the BS components 120, 121, 122, and 123 transfers the scan request message 110 to the scan control unit 110. Since the scan control unit 110 and the BS components 120, 121, 122, and 123 are all internal function blocks of the BS 100, various signals including the scan request message can be exchanged via an internal signaling system. Since the scan control unit 110 and the BS components 120, 121, 122, and 123 exchange signals via the inter signaling system, it is not necessary for the BS components 120, 121, 122, and 123 to transfer the scan request message in the format of the MOB_SCN_REQ message. However, the scan request message transmitted by one of the BS components 120, 121, 122, and 123 can include an identifier of the MS as the host of the scan and an indicator for indicating the scan request message.

If it is determined in step 310 that the received message is not the scan request message, this means that the message is the scan report (i.e., MOB_SCN_REP) message and thus the procedure goes to step 315. The scan report message can include the indicator for indicating the type of message, i.e. the scan report message, and the identifier of the MS reporting the scan result.

At step 315, the scan control unit 110 saves the scanning status of the corresponding MS as an end state to match with the MS identifier contained in the scan report message. A description is made of an exemplary method of storing the scanning status of MS with reference to Tables 4 to 8 later.

In an exemplary embodiment, it is assumed that the scan control unit 110 receives one of the scan request message and scan report message inevitably. However, the scan control unit may receive another type of message rather than the scan request message and scan report message or no message. In case that the received message is not one of the scan request message and scan report message, the scan control unit 110 can execute a process corresponding to the message. In case that no message is received, the scan control unit 110 can wait to receive a message at step 310.

If it is determined in step 310 that the scan control unit 110 has received the scan request message, the procedure goes to step 320.

At step 320, the scan control unit 110 determines whether the scanning status field of the scan request message is set to a value indicating 'in progress' and whether the predicted scan completion time has elapsed. The scan control unit 110 can determine whether a scanning is in progress by the MS based on this determination result. In order to determine the scanning status, a scanning record table 135 is retained. The scanning record table 135 can be generated in form of one of Tables 4, 6, 7, and 8 or other equivalent form available for storing the scanning status. Of course, the scanning record table 135 is not limited to the form of a table but can be generated in the form of a map, an array, a linked list, a set, or other type of data structure matching the MS identifiers.

In the following, the description is made under the assumption that the scan control unit 110 has received the scan request message from the first MS 190 for convenience of description. If it is instructed for the MS to scan (i.e., the scan response message is transmitted), the scan control unit 110 stores the scanning status of the corresponding MS as 'in progress' and stores the predicted end time of the corresponding scan to match with the identifier of the MS. For example, the scan control unit 110 can store the scanning record table 135 indicating the scanning status of the MSs 190 and 191 in the form as shown in Table 4.

TABLE 4

| MS identifier | Scanning status | Predicted end time (frame) |
|---|---|---|
| First MS CID | Progress (1: MS) | 0x000392d0 |
| ... | ... | ... |
| N<sup>th</sup> MS CID | Progress (2: LB unit) | 0x0038fa0 |

The value of the MS identifier field can be a default Connection ID (CID) of the MS. Of course, other type of the MS identifier can be used if it can be used to identifier the MS.

The scanning status field includes the information on whether the scanning is in progress. If the MS is in progress of scanning, the scanning status field can include the information on the host that requested the scanning and/or priority information of the scan in progress.

Table 5 shows the meanings of the values of the scanning status field when the scanning status value includes the host that requested the scanning as well as the information on whether the scanning is in progress.

TABLE 5

| Field value | Description | Priority |
|---|---|---|
| 0 | Completed | — |
| 1 | MS-requested scan in progress | 1 |
| 2 | ICIC unit-requested scan in progress | 1 |
| 3 | LB unit-requested scan in progress | 2 |
| 4 | LBS unit-requested scan in progress | 2 |
| 5 | SON unit-requested scan in progress | 3 |

In Table 5, if the first MS 190 has completed the scan, the scanning status of the first MS 190 is set to 0. If the first MS 190 is in progress of a scanning process requested by the ICIC 121, the scanning status of the first MS 190 is set to 2.

In Table 5, the field value is presented in association with the priority value. In the exemplary embodiment of Table 5, the scanning status field does not include explicit priority. However, the scan control unit 110 stores the scan status field value to match with the priority such that is it possible to retrieve the priority by referencing the scanning status field. The relationship between the scanning status field and the priority is referred to as the scan priority policy 210.

Unlike the exemplary embodiment of Table 5, the scanning record table 135 can include the priority field but not the scanning status field as shown in Table 6. It can be negotiated that, if the priority has a predetermined value (e.g., 0), this indicates a state in which the scanning of the corresponding MS has stopped.

TABLE 6

| MS identifier | Priority | Expected completion time (frame) |
|---|---|---|
| First MS CID | 1 | 0x00392d0 |
| ... | ... | ... |
| N<sup>th</sup> MS CID | 2 | 0x00038fa0 |

In the following description, it is assumed that a lower priority number corresponds to a higher priority, and a lower priority number is more important than a higher priority number. However, it also can be considered that the greater the priority is in number, the higher and the more important the priority is.

Unlike the exemplary embodiments of Tables 4 to 6, the scan control unit 110 can store the scanning status in the scanning record table 135 formed as shown in Table 8 with a priority field in addition to the scanning status field.

TABLE 7

| MS ID | Scanning status | Priority | Expected completion time (frame) |
|---|---|---|---|
| First MS CID | In progress (1: MS) | 1 | 0x00392d0 |
| ... | ... | ... | ... |
| N<sup>th</sup> MS CID | In progress (2: LB unit) | 2 | 0x0038fa0 |

Also, it can be considered that the scan control unit 110 manages the scanning status in the scanning record table formed without the expected completion time field. Table 8 shows the exemplary scanning record table 135 formed in such a way. In order to implement the exemplary embodiment of Table 8, it should be guaranteed for the scan control unit 110 to notify of the completion of the scanning process when the scanning of a specific MS has been completed in the coverage of the BS 100. If not guaranteed, it is necessary to provide against the case where the completion of the scanning process of a specific MS with the expected completion time field as shown in Tables 4, 6, and 7.

TABLE 8

| MS ID | Scanning status |
|---|---|
| First MS CID | In progress (1: MS) |
| ... | ... |
| N<sup>th</sup> MS CID | In progress (2: LB unit) |

In any of Tables 4 to 8, the scanning record table 135 includes information on whether the MS is in progress of a scan, priority information on the scanning process in progress or information to be used for retrieving the priority information of the scanning process in progress. The information to be used for retrieving the priority information of the scanning process in progress can be the scanning status field and the priority field.

The expected completion time field can have the value in number of frames. Of course, the number of frames as the value of the expected completion time can be replaced by a normal time format (e.g. hour, minute, second, or millisecond).

An exemplary method of determining the expected completion time is described later with the explanation of step 335.

Returning to FIG. 3, the scan control unit 110 determines whether the scanning process of the MS, i.e. the first MS 190, is in progress by referencing the received scan request message in step 320.

Here, it is assumed that the scan control unit 110 stores the scanning status in the form of Table 4. The scan control unit 110 determines the scanning status field. As described with reference to Table 5, if the scanning status field is not set to 0, this means that the scan process of the MS is in progress. In this case, it may be necessary to reference the expected completion time field. Since it is indicated that the scanning process of the first MS 190 is in progress in Table 4, the scan control unit 110 compares the value of the expected completion time field with the current time. If the current time is earlier than the expected completion time, the scan control unit 110 determines that the scan of the first MS 190 is in progress.

Otherwise, if the scanning status field is set to 0 or the current time is later than the value of the expected completion time, the scan control unit 110 determines that the scanning process of the first MS 190 is not in progress such that the procedure continues to step 335.

The scanning status can be summarized as shown in Table 9.

TABLE 9

| Scanning status field | Expected completion time | Status |
|---|---|---|
| 0 (completed) | — | Completed |
| Value not 0 | Current time < expected completion time | In progress |
| | Current time > expected completion time | Completed |

In an exemplary embodiment where the expected completion time is not stored as shown in Table 8, if the scanning status field is set to 0, it is determined that the scanning status of the MS has been completed regardless of the expected completion time.

As described above, if it is determined in step 320 that the scanning process of the first MS 190 is in progress, the procedure continues to step 330 and, otherwise, to step 335.

In step 330, the scan control unit 110 determines whether the scanning process of the first MS 190 that is in progress can be overwritten by the newly received scan request. If the priority of the received scan request is higher than the scanning process that is in progress, this means that the scanning process in progress can be overwritten. It is assumed that if a scan is started by a scan request this means the priority of the scan request is equal to that of the current scan process. The terms 'priority of scan' and 'priority of scan request' are used interchangeably.

As described with reference to Table 5, the priority of the scan request or the scan can be changed depending on the host that triggered the scan. Referring to Table 5, in case that the scan request is received from the first MS 190 or the ICIC unit 121, the priority of the scan request and the corresponding scanning process is 1. This can be applied to other scans. In any of Tables 4, 6, and 7, the scan control unit 110 can retrieve the priority of the scanning process in progress. Here, since the scanning process of the first MS 190 is in progress, the priority of the scanning process is 1. Accordingly, if the priority of the scan request is higher than 1, the scanning process of the MS 190 that is in progress can be overwritten by the scan request. However, since the value '1' indicates the highest priority in Table 5, the scanning process of the first MS 190 cannot be overwritten. Otherwise, if the scanning process of the first MS 190 that is in progress is triggered by the SON unit 123 (priority 3), the scanning process can be overwritten by a scan request transmitted by the LB unit 120 (priority 2). This is because the priority of the scan request is higher than that of the scanning process in progress.

Although it is assumed that the priority of the scan is determined depending on the host that issued the scan request in the exemplary embodiment of FIG. 3, it is also possible that there is no difference in priority between scan requests issued by different hosts. In such a case, step 330 can be skipped such that, when any scanning process is in progress, the procedure goes to step 340.

Returning to the exemplary embodiment of FIG. 3, if it is determined in step 330 that the scanning process of the first MS 190 that is in progress cannot be overwritten, the procedure goes to step 340 and, otherwise, to step 335.

Step 335 is executed when the scan request is accepted. That is, if it is determined that there is no scanning process of the first MS 190 in progress at step 320 or the scanning process in progress can be overwritten by the new scan request at step 330, the scan control unit 110 performs step 335.

In step 335, the scan control unit 110 updates the scanning status of the first MS 190 to match with the host that issued the scan request. For example, if the scan request is received from the ICIC unit 121, the scanning status is set to 2 in Table 5 to indicate that the scanning process triggered by the ICIC unit 121 is in progress. The scan control unit 110 also generates the MOB_SCN_RSP message in response to the MOB_SCN_REQ message. The MOB_SCN_RSP message is formatted as described with reference to Tables 1 and 2. The MOB_SCN_RSP message is transmitted to the first MS 190 such that the first MS 190 performs scanning according to the MOB_SCN_RSP message. The scan control unit 110 also records the expected completion time of the scanning process.

The expected completion time can be determined in different ways depending on the host that issued the scan request.

In case that the host that issued the scan request is one of the MSs 190 and 191, i.e. scan request is the MS-initiated scan request, the expected completion time is determined by Equation (1):

$$\text{Expected completion time} = \text{start frame} + \text{scan duration} + (\text{scan duration} + \text{interleaving interval}) \times ((\text{scan iteration}) - 1) \quad \text{Equation (1)}$$

In Equation (1), the start frame denotes the index of the frame in which the scanning process starts. The scan duration denotes the duration for which the MS performs scanning and is expressed in number of frames. The scan duration is also referred to as a scan interval.

The start frame is the index of the frame from which the first scan interval starts.

The interleaving interval is the time duration between two scan intervals. The MS can communicate with the serving BS during the interleaving interval.

The scan iteration denotes a number of iterations of the scan interval.

The scan duration, start frame, interleaving interval, and scan iteration are determined by the BS 100 according to a predetermined method. The method for determining the scan duration, start frame, interleaving interval, and scan iteration can be any of the known methods necessary for generating the MOB_SCN_REQ message, and thus detailed descriptions thereof are omitted herein.

That is, the scan control unit 110 receives the MOB_SCN_REQ message from one of the MSs 190 and 191 and, once it is decided to accept the scan request, determines the scan duration, start frame, interleaving interval, and scan iteration.

The scan control unit 110 determines the expected completion time by applying the determined values to Equation (1).

Table 10 shows how to determine the expected completion time of the MS-initiated scan.

TABLE 10

| Operation | Time at operation completion |
|---|---|
| No scanning in progress | F |
| First scan interval | F + S |
| First interleaving interval | F + S + I |
| Second scan interval | F + S + (I + S) |
| ... | ... |
| $(N-1)^{th}$ interleaving interval | F + (I + S)(N − 1) |
| $N^{th}$ interleaving interval | F + S + (I + S)(N − 1) |

In case that the scan request is issued by one of the BS components 120, 121, 122, and 123, i.e. the scan request is a BS-initiated scan request, the expected completion time is determined by Equation (2):

$$\text{Expected completion time} = \text{start frame} + \text{report period} + \text{preset margin} \quad \text{Equation (2)}$$

In Equation (2), the report period denotes the period for reporting the scan result to the BS 100. In case that the MS is configured to report the scan result periodically, the initial report period can be used. In order to generate the MOB_SCN_RSP message, the scan control unit determines the report period according to a predetermined method.

The preset margin denotes a period necessary for the scan control unit 110 to process the scan result completely. Although it depends on the system, the preset margin can be set to one or two frames.

Returning to FIG. 3, the scan control unit 110 stores the expected completion time determined by the aforementioned method in match with the identifier of the first MS 190 at step 335.

Summing up the operation at step 335, the scan control unit 110 updates the scanning status field and the expected completion time field and transmits the MOB_SCN_RSP message to the first MS 190.

The scanning status field and the expected completion time field updated at step 335 are referenced to determine whether any scanning process of the first MS 190 is in progress or, if any, whether the scanning process can be overwritten by the scan request issued to the first MS 190 afterward. Exemplary methods of determining whether there is any scanning process in progress has been described in association with steps 320 and 330.

Step 340 is performed when the scanning process in progress can be overwritten by the requested scan.

At step 340, the scan control unit 110 determines whether the type of the scan request is a BS-initiated scan request. The type of the scan request can be one of a BS-initiated scan request and an MS-initiated scan request. If the scan request is the BS-initiated scan request, the procedure goes to step 355 and, otherwise if the scan request is the MS-initiated scan request, the procedure goes to step 350.

At step 350, the scan control unit 110 transmits the MOB_SCN_RSP message to the first MS 190 in response to the MS-initiated scan request. However, since step 350 is executed when the scan request is rejected, the MOB_SCN_RSP message transmitted at step 350 can contain an indicator for indicating that the scan request is rejected. That is, the MOB_SCN_RSP message transmitted at step 350 can include the indicator notifying of the rejection of the scan request. The MOB_SCN_RSP message containing the indicator notifying of the rejection on the scan request can be referred to as a scan rejection message.

At step 355, the scan control unit 110 sends the BS component that issued the scan request a signal notifying that the BS-initiated scan request cannot be accepted. The signal indicating that the scan request cannot be accepted can be referred to as the scan rejection message.

As described above, the apparatus and method for controlling the scanning process of a mobile station is advantageous to avoid the collision of scanning processes.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instruction for performing a specific logic function(s). Moreover, it should be noted that the functions of the blocks may be performed in different order in several modifications. For example, two successive blocks may be performed substantially at the same time, or may be performed in reverse order according to their functions.

The term "module" according to exemplary embodiments of the invention, denotes, but is not limited to, a software or hardware component, such as a Field Programmable Gate Array (FPGA) or an Application Specific Integrated Circuit (ASIC), which performs certain tasks. A module may advantageously be configured to reside on the addressable storage medium and be configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more Central Processing Unit (CPU) in a device or a secure multimedia card.

The foregoing disclosure has been set forth merely to illustrate the invention and is not intended to be limiting. Since modifications of the disclosed exemplary embodiments incorporating the spirit and substance of the invention may occur to persons skilled in the art, the invention should be construed to include everything within the scope of the appended claims and equivalents thereof.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a base station for controlling a scanning process of a mobile station, the method comprising:
   receiving, at the base station, a scan request issued in association with the mobile station;
   determining whether the mobile station has a scan in progress by referencing a scan record table stored in the base station;
   transmitting a scan response to the mobile station according to the scan record table; and
   recording a scanning status of the mobile station in the scan record table,
   wherein the scan record table stores information on the mobile station's scanning of frequencies corresponding to neighbor cells, the information including a mobile station identifier corresponding to the mobile station and information indicating whether the mobile station has a scan in progress.

2. The method of claim 1, wherein the transmitting of the scan response comprises transmitting, when the mobile station has a scan in progress, a scan rejection to the mobile terminal or to a base station component that issued the scan request.

3. The method of claim 1, wherein the transmitting of the scan response comprises:
   comparing, when the mobile station has a scan in progress, a priority of the scan in progress with a priority of a new scan instructed by the scan request;
   transmitting, when the priority of the new scan is higher than the priority of the scan in progress, the scan response accepting the scan request to the mobile station; and
   recording, when the priority of the new scan is equal to or lower than the priority of the scan in progress, the scanning status of the mobile station in the scan record table.

4. The method of claim 3, wherein the transmitting of the scan response comprises transmitting, when the mobile station has a scan in progress and the priority of the new scan is equal to or lower than the priority of the scan in progress, a scan rejection to the mobile terminal or to a base station component that issued the scan request.

5. The method of claim 4, wherein the transmitting of the scan response comprises storing the priority of the scan instructed by the scan request in the scan record table corresponding with the identifier of the mobile station.

6. The method of claim 5, wherein the comparing comprises:
   retrieving a priority corresponding to the mobile station from the scan record table; and
   comparing the retrieved priority with the priority of the scan instructed by the scan request by comparing the priority of the scan instructed by the scan request with the priority corresponding to the mobile station.

7. The method of claim 1, wherein the transmitting of the scan response comprises storing an expected completion time of the scan instructed by the scan request in the scan record table corresponding with an identifier of the mobile station.

8. The method of claim 7, wherein the determining comprises:
   retrieving an expected completion time of the scan instructed by the scan request from the scan record table; and
   determining, when the current time is earlier than the predetermined completion time, that the mobile station has the scan in progress.

9. The method of claim 7, wherein the expected completion time of the scan instructed by the scan request which is a mobile station-initiated scan request is determined by the following equation:

expected completion time=start frame+scan duration+ (scan duration+interleaving interval)×((scan iteration)−1).

10. The method of claim 7, wherein the expected completion time of the scan instructed by the scan request which is a base station-initiated scan request is determined by the following equation:

expected completion time=start frame+report period+ preset margin.

11. A base station for controlling a mobile station, the base station comprising:
    a scan control unit for receiving, at the base station, a scan request issued in association with the mobile station, for determining whether the mobile station has a scan in progress by referencing a scan record table stored in the base station, for transmitting a scan response to the mobile station according to the scan record table, and for recording a scanning status of the mobile station in the scan record table;
    a scan request component for generating a scan request to the scan control unit; and
    a communication unit for delivering the scan request received from the mobile station to the scan control unit and for transmitting the scan response received from the scan control unit to the mobile station,
    wherein the scan record table stores information on the mobile station's scanning of frequencies corresponding to neighbor cells, the information including a mobile station identifier corresponding to the mobile station and information indicating whether the mobile station has a scan in progress.

12. The base station of claim 11, wherein the scan control unit transmits, when the mobile station has a scan in progress, a scan rejection to the mobile terminal or to a base station component that issued the scan request.

13. The base station of claim 11, wherein the scan control unit compares, when the mobile station has a scan in progress, a priority of the scan in progress with a priority of a new scan instructed by the scan request, transmits, when the priority of the new scan is higher than the priority of the scan in progress, the scan response accepting the scan request to the mobile station, and records, when the priority of the new scan is equal to or lower than the priority of the scan in progress, the scanning status of the mobile station in the scan record table.

14. The base station of claim 13, wherein the scan control unit transmits, when the mobile station has a scan in progress and the priority of the new scan is equal to or lower than the priority of the scan in progress, a scan rejection to the mobile terminal or to a base station component which issued the scan request.

15. The base station of claim 14, wherein the scan control unit stores, when the mobile station has the scan in progress and the priority of the new scan is equal to or lower than the priority of the scan in progress, the priority of the scan instructed by the scan request in the scan record table corresponding with an identifier of the mobile station.

16. The base station of claim 15, wherein the scan control unit retrieves, when the mobile station has a scan in progress, a priority corresponding to the mobile station from the scan record table and compares the retrieved priority with the priority of the scan instructed by the scan request by comparing the priority of the scan instructed by the scan request with the priority corresponding to the mobile station.

17. The base station of claim 11, wherein the scan control unit stores an expected completion time of the scan instructed by the scan request in the scan record table corresponding with an identifier of the mobile station.

18. The base station of claim 17, wherein the scan control unit retrieves an expected completion time of the scan instructed by the scan request from the scan record table and determines, when the current time is earlier than the predetermined completion time, that the mobile station has the scan in progress.

19. The base station of claim 17, wherein the scan control unit determines the expected completion time of the scan instructed by the scan request which is a mobile station-initiated scan request using the following equation:

expected completion time=start frame+scan duration+
(scan duration+interleaving interval)×((scan
iteration)−1).

20. The base station of claim 17, wherein the scan control unit determines the expected completion time of the scan instructed by the scan request which is a base station-initiated scan request using the following equation:

expected completion time=start frame+report period+
preset margin.

* * * * *